United States Patent Office 3,150,087
Patented Sept. 22, 1964

3,150,087
EXTREME PRESSURE LUBRICANTS
Rudolph J. Holzinger, Haddonfield, N.J., assignor to Socony Mobil Oil Company, Inc., a corporation of New York
No Drawing. Filed Dec. 6, 1961, Ser. No. 157,550
10 Claims. (Cl. 252—25)

This invention relates to lubricating oil compositions, solid, semi-solid or fluid, possessing extreme pressure properties. The invention more specifically relates to lubricant compositions adapted for use under extremes of pressure and/or temperature. This application is a continuation-in-part of application Serial No. 809,608 filed April 29, 1959, and now abandoned.

For many years, there have been developments of improved lubricants designed to meet ever-increasing demands for effective lubrication of machinery operating at high pressure and/or high temperatures. As this art has developed, it has been learned that certain elements are much more advantageous than others. Phosphorus and sulfur, alone or chemically combined with each other or with other elements, have been found to be efficacious. Halogens, and particularly chlorine, are advantageous. Among the metals, tin and lead have received considerable attention. Others include graphite and molybdenum. Despite the improvements realized with such materials, there are today applications in which such materials are not completely satisfactory. Present-day machine tools, gears, aircraft, etc. operate with pressures of many thousands of pounds per square inch and at temperatures of 1000° F. and greater. Moreover, advance space vehicles such as missiles, rockets, satellites and the like encounter conditions of temperature, pressure and radiation ranging from −300° F. to +1500° F., $10^{-7}$ inches of mercury (ambient) to thousands of pounds per square inch (operating) and radiation up to $10^{14}$ ergs per gram of carbon. Equipment now in the design stage demands lubricants not now available. This invention is directed to lubricants which go beyond the capabilities of available lubricants with regard to extremes of pressure, temperature and radiation.

The lubricants of this invention contain a particular allotropic form of phosphorus identified as black phosphorus. As is explained further below, black phosphorus is known to exist in two forms: crystalline and amorphous. While both forms are contemplated herein, the crystalline form is preferred on the basis of its greater thermal stability.

It is recognized that phosphorus has been known for some time to be useful in lubricant compositions. However, elemental phosphorus used earlier has been either ordinary yellow (white) phosphorus or red phosphorus. Each of these forms has proven to be deficient in one or more respects. Yellow phosphorus inflames in air and is less stable than the other allotropes. Further, yellow phosphorus reacts readily with hydrocarbons such as those in lubricating oils to form products corrosive to metals. It has been suggested, therefore, that yellow phosphorus be used in oil in combination with a corrosion inhibitor which counteracts the action of the phosphorus-oil reaction products. When yellow phosphorus is used in such oil compositions, it does not remain in elemental form but combines chemically with the oil, thereby lessening the improvements which it is intended to impart to the oil. Still another deficient of yellow phosphorus is its low melting point of 111° F.; this limits the temperature range over which it may be used for lubricating purposes.

Red phosphorus is also unstable for, on exposure to air at normal temperatures and humidities, it reacts with water vapor and oxygen to form phosphine and a mixture of acids of phosphorus. Here again, a corrosion inhibitor would be necessary to offset such products, when red phosphorus is used in oil. Another undesirable feature of red phosphorus is that it can be ignited when subjected to mild shock, such as a hammer blow. Red phosphorus is converted to the yellow allotrope when distilled at 554° F.; therefore, it is converted to the most unstable form of phosphorus. It catches fire when heated in air to about 500° F.

In contrast to the yellow and red allotropes, black phosphorus is completely stable in air up to its melting point. It is so stable it can be sawed and machined with safety. It is ignited with a match, but only with difficulty. This great difference in chemical stability indicates that black phosphorus remains as such in a lubricating environment, as opposed to yellow and red phosphorus. In addition to the great difference in chemical stability, there are comparable differences in physical properties. Black phosphorus has a density of 2.69 (g./cc.), in contrast to 1.83 and 2.16–2.31 for yellow and red phosphorus respectively. As revealed in the literature, the crystal structures of the allotropes are different, one from the other. (Tennessee Valley Authority; Chemical Engineering Report No. 8: Phosphorus, Properties of the Element and Some of Its Compounds; Wilson Dam, Alabama, 1950.) The melting point of black prosphorus is also reported to be 1130° F., slightly higher than that of red phosphorus.

As a further important difference, black phosphorus is relatively non-toxic since it is non-reactive under normal conditions. Opposed to this is the highly toxic character of the usual forms of phosphorus.

Black phosphorus, in crystalline form, is prepared by subjecting ordinary yellow (also referred to as white) phosphorus to a temperature up to 200° C. (392° F.) and pressures up to 13,000 kilograms per square centimeter for 5 to 30 minutes. The reaction is described as irreversible. This process is described by P. W. Bridgman in a paper entitled "Two Modifications of Phosphorus," J.A.C.S. 36, 1344–63 (1914).

Amorphous black phosphorus and its method of preparation are given in a paper of R. B. Jacobs entitled "Phosphorus at High Temperatures and Pressures," which appeared in the Journal of Chemical Physics 5, 2945–53 (1937). The amorphous form of black phosphorus is formed in a slower transition than the crystalline form, by subjecting white (or yellow) phosphorus to about 392° F. (200° C.) and about 12,000 atmospheres.

Dispersions of black phosphorus can be prepared by dissolving yellow phosphorus in a mixture of non-reactive carbon disulfide and benzene. The solution is subjected to high temperature and pressure to convert the phosphorus to black phosphorus. A colloidal dispersion can also be prepared by reducing previously prepared black phosphorus to colloidal size in a suitable vehicle.

While a wide range of particle size of black phosphorus can be used, depending upon the machine to be lubricated, the particle size preferred is about .1 to 10 microns. The black phosphorus can be initially prepared in a larger size and reduced to this desired particle size by bombardment, by grinding or various other methods. The smaller the particle size, the more readily the material disperses in the base lubricant and furthermore remains in dispersion without settling. As the base lubricant becomes thicker, progressing from a light oil to a heavy oil, to a grease, both semi-solid and solid, larger particles can be used successfully without danger of separation. The exercise of some judgment is required, therefore, in selecting the particle size of the black phosphorus for cooperation with the base oil or lubricant. In general, however, the smaller the particle, the more effective the additive for a given concentration.

The compositions of this invention comprise a major proportion of a lubricating oil and about 0.01 to 10% by weight of the total composition of black phosphorus. The lubricating medium may comprise solely a light or heavy oil, mineral or synthetic, or may comprise a grease viz. an oil thickened with a thickening agent, such as calcium, lithium or sodium soaps. The broad particle size of the black phosphorus may be .05–50 microns but the preferred range is 0.1–10 microns. The preferred amount of black phosphorus for use in the total composition is about 0.05–5% by weight. The total composition contains, as indicated, a major portion of oil, thickeners as needed, anti-corrosive agents, anti-oxidants, etc. While most synthetic oils can be used, the silicones or silicates are specifically excluded since they are not effective in combination with black phosphorus. Other types of synthetic oils, such as ester and diester oils are usable and are included within the scope of this invention.

When using the black phosphorus in the larger particle size, such as about 10 microns up to as high as abou 50 microns, it is preferable to incorporate the particles properly dispersed in a grease. Such greases can contain conventional soaps, complex soaps, inorganic gelling agents and synthetic gelling agents. Typical of conventional soaps are: sodium, lithium, calcium, barium, lead and aluminum soaps of such acids as stearic, oleic, palmitic, hydroxy stearic, etc. Complex soaps are illustrated by calcium stearate-acetate (2,197,263), barium stearate-acetate (2,564,561); calcium caprylate-calcium acetate as described in U.S. Patent No. 2,999,066 which issued September 5, 1961; calcium stearate-caprylate-acetate as described in U.S. Patent No. 2,999,065 which issued September 5, 1961. Inorganic gelling agents are represented by bentone and silica gel. Typical synthetic gelling agents are: metal salts of reaction products obtained by reaction of alcohols or amines with acidic copolymers of alpha, beta, unsaturated polycarboxylic acids or their anhydrides with low molecular weight compounds having a terminal vinyl group (2,698,297); metal salts of copolymers of alpha, beta unsaturated polycarboxylic acids or their anhydrides with aliphatic compounds having a terminal vinyl group (2,698,298); esters of phosphoric acid (2,790,767); non-soaps such as Bentone 34, Aerosil, Santocel, Rutile Attapulgite, carbon black, boron nitride, copper phthalocyanine, vermiculite, aryl-substituted ureas, complex aromatic imides, complex aromatic sulfonamides and sulfonyls, polyphenyl metallic complexes, tetra substituted ureas, and high melting point polymers.

Dispersions of black prosphorus can be made with a variety of vehicles for a variety of lubrication purposes. As indicated, mineral lubricating oils can be used. Suitable mineral oils are those normally used for: extreme pressure lubricants, ranging in viscosity from 100 seconds S.U.V. at 100° F. to 500 seconds at 210° F.; cutting oils, ranging in viscosity from 40 to about 200 S.U.V. at 100° F.; greases with viscosities ranging from 40 seconds to 6,000 seconds at 100° F. Synthetic vehicles can be used, instead of mineral oils, or in combination therewith. Typical synthetic vehicles are: polypropylene, polypropylene glycol, diesters, neopentyl and pentaerythritol esters, di-(2-ethyl hexyl) sebacate, di-(2-ethyl hexyl) adipate, dibutyl phthalate, polyethylene glycol di-(2-ethyl hexoate), hydrogenated mineral oils, chain type polyphenyls, etc.

In order to demonstrate the unusual load carrying ability of black phosphorus-oil formulations, varying amounts of black phosphorus and molybdenum disulfide (a known agent for use under high pressure conditions) were mixed with a lithium hydroxy-stearate-stearate grease made from a 55/60 S.U.S. @ 210° F. solvent-refined coastal oil. The results of the Four Ball Weld Tests conducted with these lubricant formulations is presented in Table I as follows:

*Table I*

FOUR BALL WELD LOADS, KG.

| Percent solid, by wt. | 0 (base grease) 90–110 | 0.2 | | 1.6 | | 3.2 | |
|---|---|---|---|---|---|---|---|
| | | MoS$_2$ | P$_8$ | MoS$_2$ | P$_8$ | MoS$_2$ | P$_8$ |
| 25–50 micron particles | | | 130 | | 160 | | |
| 5 micron particles | | | | 140 | | | |
| 0.75 micron particles | | 110 | | 160 | | 210 | |

It is seen from Table I that black phosphorus (P$_8$) compares favorably with molybdenum disulfide (MoS$_2$) since the performance improves with increase in concentration (left to right) and decreases in particle size (top to bottom). The effectiveness of lubricant solids is a function of available surface area. It is seen, therefore, that at 1.6% addition agent, the black phosphorus was equivalent to the molybdenum disulfide lubricant even though the black phosphorus used was roughly 50 times coarser, i.e., possessed only about 1/2500 the surface area of molybdenum disulfide.

In order to show comparative performance of black phosphorus lubricants with mica and graphite lubricant formlations, mica, graphite and black phosphorus of similar particle size were obtained and employed in 5% by weight concentration in the same lithium base grease. These formulations were subjected to the commonly accepted and well-known Almen Pin test and the Falex test. The test results are shown in Table II hereinbelow:

*Table II*

| Additive | Almen Pin, p.s.i. | Falex, pounds |
|---|---|---|
| None (base grease) | 4,000 | 610 |
| Mica | 7,000 | 1,150 |
| Graphite | 4,000 | 950 |
| Black phosphorus | 13,000 | 3,700 |

At the end of the Falex test, specimens using black phosphorus showed heat coloring indicating that a temperature of 640° F. or higher was reached. None of the other specimens showed heat discoloration indicating failure below 400° F. The high temperatures reached with the black phosphorus lubricant formulation were also shown by the fact that the grease (Dropping Point about 375° F.) dropped off the pin well before failure occurred, with considerable smoking of the remaining oil. These data demonstrate clearly the unusual load carrying ability of black phosphorus containing lubricants when compared with well known high-load formulations and also the unusual high temperature characteristics of black phosphorus containing lubricant formulations.

In order to show the comparative performance of a smaller amount of black phosphorus, a separate series of tests was made using the base grease as reported in Table II and the base grease plus 0.5% black phosphorus added. These formulations were subjected to the commonly accepted and well-known Almen Pin test and the Falex test. The test results are shown in Table III hereinbelow:

*Table III*

| Additive | Almen Pin, p.s.i. | Falex, pounds |
|---|---|---|
| None (base grease) | 4,000 | 610 |
| Black phosphorus (.5%) | 6,000 | 1,690 |

It is seen that even with small percentage of black phosphorus added, the improvement in load support capability is still marked. At the 0.5% concentration of black phosphorus, results obtained in the Falex test are superior to either graphite or mica employed in a concentration 10 times greater, viz. 5% by weight.

In order to show comparative results of black phosphorus additions to a lubricating oil, a series of tests was conducted using, as a basis of comparison, an S.A.E. 90 gear oil. Additions of 1% of a suitable dispersant (basic calcium petroleum sulphonate), 0.5% black phosphorus, 5.0% black phosphorus and 0.05% black phosphorus were made and compared by means of the Almen Pin and Falex tests. The test was conducted in the customary fashion except that the lubricant was applied by merely wetting the surfaces instead of by complete immersion. The comparative results are shown in Table IV as follows:

*Table IV*

| Material | Almen Pin, p.s.i. | Falex, pounds |
|---|---|---|
| Base oil | 5,000 | 1,420 |
| Base oil plus 1% dispersant* | 5,000 | 1,420 |
| Base oil plus 1% dispersant plus 0.05% $P_s$ | 8,000 | |
| Base oil plus 1% dispersant plus 0.5% $P_s$ | 9,000 | 1,620 |
| Base oil plus 1% dispersant plus 5.0% $P_s$ | 9,000 | 2,030 |

* Basic calcium petroleum sulphonate having a molecular weight of about 975-1000.

It is seen from the results of Table IV that the addition of black phosphorus results in substantial improvement in the load support characteristics of the oil. It is seen also that there is comparatively little difference in performance over the range of black phosphorus additions reported in Table IV, therefore, it is not necessary to use large proportions of black phosphorus to get significant improvement. It is not absolutely essential to use a dispersant but there is a tendency toward flocculation when a dispersant is not used and this increases the possibility of the additive settling out, particularly when the lubricant is not kept in continuous agitation.

It is understood that the compositions contemplated herein can also contain other characterizing materials. For example, antioxidants, corrosion inhibitors, viscosity index agents, pour point depressants, other extreme pressure agents, etc. can be used. These characterizing materials do not detract from the lubricating value of the compositions of this invention, nor do they detract from the beneficial properties imparted by black phosphorus; rather, these characterizing materials serve to impart their customary properties to the particular composition in which they are incorporated.

I claim:
1. A lubricating composition consisting essentially of a lubricating oil free from organic silicone compounds and black phosphorus in particulate form, said black phosphorus having a particle size of about .05 to 50 microns, and being present in an amount sufficient to impart improved load carrying ability to said lubricating composition.

2. A lubricating composition consisting essentially of a lubricating oil free from organic silicone compounds and black phosphorus in particulate form, said black phosphorus having a particle size of about 0.1 to 10 microns, and being present in an amount sufficient to impart improved load carrying ability to said lubricating composition.

3. A lubricating composition comprising a major proportion of a lubricating oil free from organic silicone compounds and black phosphorus in particulate form, said black phosphorus having a particle size of about .05 to 50 microns, and being present in an amount of about .01 to 10% by weight of the total composition.

4. A lubricating composition comprising a major proportion of a lubricating oil free from organic silicone compounds and black phosphorus in particulate form, said black phosphorus having a particle size of about .05 to 50 microns, and being present in an amount of about .05 to 5% by weight of the total composition.

5. A lubricating composition comprising a major proportion of a lubricating oil free from organic silicone compounds and black phosphorus in particulate form, said black phosphorus having a particle size of about 0.1 to 10 microns, and being present in an amount of about .01 to 10% by weight of the total composition.

6. A lubricating composition comprising a major proportion of a lubricating oil free from organic silicone compounds and black phosphorus in particulate form, said black phosphorus having a particle size of about 0.1 to 10 microns, and being present in an amount of about .05 to 5% by weight of the total composition.

7. A lubricating composition consisting essentially of a lubricating oil free from organic silicone compounds having a viscosity in the range of about 40 to 6,000 S.U.S. at 100° F. and black phosphorus in particulate form, said black phosphorus having a particle size of about .05 to 50 microns, and being present in an amount sufficient to impart improved load carrying ability to said lubricating composition.

8. A lubricating composition comprising a major proportion of a lubricating oil free from organic silicone compounds having a viscosity in the range of about 40 to 6,000 S.U.S. at 100° F. and black phosphorus in particulate form, said black phosphorus having a particle size of about .05 to 50 microns, and being present in an amount of about .01 to 10% by weight of the total composition.

9. A lubricating grease consisting essentially of a lubricating oil free from organic silicone compounds, a thickening agent and black phosphorus in particulate form, said black phosphorus having a particle size of about .05 to 50 microns, and being present in an amount sufficient to impart improved load carrying ability to said lubricating grease.

10. A lubricating grease comprising a major proportion of a lubricating oil free from organic silicone compounds, a thickening agent and black phosphorus in particulate form, said black phosphorus having a particle size of about .05 to 50 microns, and being present in an amount of about .01 to 10% by weight of the total composition.

References Cited in the file of this patent

UNITED STATES PATENTS

| 1,234,862 | Brown | July 31, 1917 |
| 2,235,161 | Morway et al. | Mar. 18, 1941 |
| 2,290,859 | Burk et al. | July 28, 1942 |

FOREIGN PATENTS

| 717,969 | Germany | Mar. 3, 1942 |

OTHER REFERENCES

Georgi, "Motor Oils and Engine Lubrication," Reinhold Publishing Corp., New York, 1950, page 163.

Davey, Extreme Pressure Lubrication, in "Scientific Lubrication," June 1955, pages 23–27.

"Phosphorus and Its Compounds," Van Vanzer, Interscience Pub. Inc., New York, 1958, vol. I, Chemistry, pages 119–123.